(12) United States Patent
Goyal et al.

(10) Patent No.: US 12,517,971 B2
(45) Date of Patent: Jan. 6, 2026

(54) SYSTEMS AND METHODS FOR IMPROVING VISUAL DIVERSITIES OF SEARCH RESULTS IN REAL-TIME SYSTEMS WITH LARGE-SCALE DATABASES

(71) Applicant: Walmart Apollo, LLC, Bentonville, AR (US)

(72) Inventors: Manik Goyal, Jersey City, NJ (US); Ari Kast, Glen Ridge, NJ (US); Rashad Eletreby, Burlington, NJ (US); Xinyi Liu, Sunnyvale, CA (US); Binwei Yang, Milpitas, CA (US); Cun Mu, New York, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/426,993

(22) Filed: Jan. 30, 2024

(65) Prior Publication Data

US 2024/0256625 A1    Aug. 1, 2024

Related U.S. Application Data

(60) Provisional application No. 63/442,028, filed on Jan. 30, 2023.

(51) Int. Cl.
*G06F 7/00* (2006.01)
*G06F 16/583* (2019.01)
(Continued)

(52) U.S. Cl.
CPC .......... *G06F 16/954* (2019.01); *G06F 16/583* (2019.01); *G06F 16/9538* (2019.01)

(58) Field of Classification Search
CPC .. G06F 16/954; G06F 16/583; G06F 16/9538; G06F 16/24578; G06F 16/532
See application file for complete search history.

(56) References Cited

U.S. PATENT DOCUMENTS

| | | | |
|---|---|---|---|
| 8,949,253 B1 * | 2/2015 | Jing | G06F 16/583 707/723 |
| 9,747,628 B1 * | 8/2017 | Sarmento | G06Q 30/0625 |

(Continued)

OTHER PUBLICATIONS

A Smart System for Selection of Optimal Product Images in E-Commerce: Abon Chaudhuri, Paolo Messina, Samrat Kokkula, Aditya Subramanian, Abhinandan Krishnan, Shreyansh Gandhi, Alessandro Magnani, Venkatesh Kandaswamy Walmart Labs, Sunnyvale, CA, USA, (Year: 2018).*

*Primary Examiner* — Mohammed R Uddin
(74) *Attorney, Agent, or Firm* — FOLEY & LARDNER LLP (57) ABSTRACT

A system including one or more processors and one or more non-transitory computer-readable storage devices storing computing instructions that, when run on the one or more processors, cause the one or more processors to execute operations: storing image hashes corresponding to images for items offered via an electronic platform; receiving, from a computing device, a search query via a search engine included on the electronic platform; executing a relevance function; executing a visual diversity ranking function that reorders the relevant set of search results to generate a ranked set of search results, wherein the visual diversity ranking function utilizes the image hashes corresponding to the subset of the items to reorder the relevant set of search results; and transmitting the ranked set of search results to the computing device. Other embodiments are disclosed herein.

20 Claims, 6 Drawing Sheets

(51) Int. Cl.
*G06F 16/9538* (2019.01)
*G06F 16/954* (2019.01)

(56) References Cited

U.S. PATENT DOCUMENTS

| | | | | |
|---|---|---|---|---|
| 10,282,431 | B1* | 5/2019 | Bhotika | G06F 16/5838 |
| 10,664,722 | B1* | 5/2020 | Sharma | G06F 18/22 |
| 10,776,417 | B1* | 9/2020 | Ravichandran | G06N 5/046 |
| 10,824,942 | B1* | 11/2020 | Bhotika | G06N 3/08 |
| 11,037,071 | B1* | 6/2021 | Tekiela | G06V 10/764 |
| 11,062,372 | B2 | 7/2021 | Jadhav et al. | |
| 11,676,192 | B1* | 6/2023 | Moore | G06Q 30/0631 |
| | | | | 705/26.7 |
| 2006/0195440 | A1* | 8/2006 | Burges | G06F 16/337 |
| | | | | 707/999.005 |
| 2007/0067304 | A1* | 3/2007 | Ives | G06F 16/951 |
| 2007/0239707 | A1* | 10/2007 | Collins | G06F 16/35 |
| | | | | 707/999.005 |
| 2008/0120292 | A1* | 5/2008 | Sundaresan | G06F 16/355 |
| | | | | 707/999.005 |
| 2009/0313239 | A1* | 12/2009 | Wen | G06F 16/5838 |
| | | | | 707/999.005 |
| 2010/0094840 | A1* | 4/2010 | Donnelly | G06Q 30/02 |
| | | | | 707/E17.061 |
| 2010/0223134 | A1* | 9/2010 | Lunenfeld | G06Q 30/0256 |
| | | | | 705/26.1 |
| 2010/0250527 | A1* | 9/2010 | Gnanamani | G06Q 30/02 |
| | | | | 707/726 |
| 2010/0306249 | A1* | 12/2010 | Hill | G06F 16/9535 |
| | | | | 707/769 |
| 2011/0196859 | A1* | 8/2011 | Mei | G06F 16/248 |
| | | | | 707/723 |
| 2012/0253984 | A1* | 10/2012 | Westphal | G06F 16/951 |
| | | | | 707/706 |
| 2013/0084002 | A1* | 4/2013 | Bhardwaj | G06F 16/5838 |
| | | | | 382/165 |
| 2013/0198174 | A1* | 8/2013 | Poznanski | G06F 16/9535 |
| | | | | 707/723 |
| 2013/0246412 | A1* | 9/2013 | Shokouhi | G06F 16/9538 |
| | | | | 707/E17.084 |
| 2013/0254191 | A1* | 9/2013 | He | G06F 16/583 |
| | | | | 707/728 |
| 2014/0250115 | A1* | 9/2014 | Yang | G06F 16/24578 |
| | | | | 707/728 |
| 2014/0379708 | A1 | 12/2014 | Fox | |
| 2016/0342600 | A1* | 11/2016 | Salaka | G06F 16/248 |
| 2016/0350336 | A1* | 12/2016 | Checka | G06V 10/454 |
| 2017/0185665 | A1* | 6/2017 | Gong | G06F 16/9024 |
| 2018/0107685 | A1* | 4/2018 | Kale | G06F 16/3344 |
| 2018/0107902 | A1* | 4/2018 | Yang | G06N 3/084 |
| 2018/0137551 | A1* | 5/2018 | Zheng | G06F 16/583 |
| 2018/0157681 | A1* | 6/2018 | Yang | G06F 16/583 |
| 2018/0181569 | A1* | 6/2018 | Jarr | G06Q 30/0603 |
| 2018/0336638 | A1* | 11/2018 | Dziabiak | G06F 7/08 |
| 2019/0258895 | A1* | 8/2019 | Sacheti | G06V 40/10 |
| 2019/0354609 | A1* | 11/2019 | Huang | G06F 16/532 |
| 2020/0089808 | A1 | 3/2020 | Liu | |
| 2021/0026906 | A1* | 1/2021 | Reznik | G06F 16/9536 |
| 2021/0118034 | A1 | 4/2021 | Indrakanti et al. | |
| 2021/0240760 | A1 | 8/2021 | Yang et al. | |
| 2024/0311421 | A1* | 9/2024 | Lathia | G06F 16/538 |

\* cited by examiner

- 401– Storage Module(s)
  - 330– Electronic Platform
    - 410– Database(s)
      - 405– Item Database
        - 310– Items
          - 311– Images
      - 392– Image Hash Database
        - 395– Image Hashes
    - 320– Search Engine
      - 325– Search Queries
      - 350– Relevance Function
        - 351– Query-Item Relevance Scores
      - 360– Visual Diversity Ranking Function
        - 361– Item-Item Similarity Scores
        - 362– Similarity Component
    - 380– Search Results
      - 381– Relevance Set
      - 382– Ranked Set
    - 390– Image Hashing Function
      - 391– Perceptual Hashing Function
      - 393– Locality Parameter
- 402– Processing Module(s)

610– Storing image hashes corresponding to images for items offered via an electronic platform 620– Receiving, from a computing device, a search query via a search engine included on the electronic platform 630– Executing a relevance function that identifies a relevant set of search results corresponding to a subset of the items determined to be relevant to the search query 640– Executing a visual diversity ranking function that reorders the relevant set of search results to generate a ranked set of search results 650– Transmitting the ranked set of search results to the computing device

FIG. 6

SYSTEMS AND METHODS FOR IMPROVING VISUAL DIVERSITIES OF SEARCH RESULTS IN REAL-TIME SYSTEMS WITH LARGE-SCALE DATABASES

CROSS REFERENCE TO RELATED APPLICATIONS

This Application claims priority to U.S. Provisional Patent Application No. 63/442,028, filed on Jan. 30, 2023, which is herewith incorporated by reference in its entirety.

TECHNICAL FIELD

This disclosure relates generally to ranking and presenting search results using techniques that jointly consider the relevance and visual diversity of the search results.

BACKGROUND

Various platforms provide a search engine that enables the users to search for items (e.g., products and/or services) in an electronic catalog. A large-scale database can store information for thousands or millions of items included in the electronic catalog. In many scenarios, the large-scale database can include multiple items that are identical and/or very similar to each other.

In response to receiving a search query, the search engine can execute a search on the electronic catalog and identify items that are determined to be relevant to the search query. In certain scenarios, the relevant items identified by the search engine are presented in a listing of search results in an ordering that lists the search results from most relevant to least relevant.

The aforementioned technique for ranking and presenting search results is suboptimal because it often results in identical or similar items being clustered together or presented consecutively in the search results. For example, because the large-scale database may include multiple listings of items that are identical or similar, the beginning portion of the search results may be populated with a first cluster of items that are all identical or similar to each other. This first cluster of items may be followed by a second cluster of items that are all identical or similar to each other, and subsequent portions of the search results may include additional clusters of search results corresponding to identical or similar items. Presenting search results in this manner can frustrate the users' experiences on the electronic platform and can make it difficult to identify desired items in the online catalog.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real time or somewhat delayed from a triggering event. In a number of embodiments, "real-time" can mean real time less than a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform functions comprising: storing image hashes corresponding to images for items offered via an electronic platform; receiving, from a computing device, a search query via a search engine included on the electronic platform; executing a relevance function that identifies a relevant set of search results corresponding to a subset of the items determined to be relevant to the search query; executing a visual diversity ranking function that reorders the relevant set of search results to generate a ranked set of search results, wherein the visual diversity ranking function utilizes the image hashes corresponding to the subset of the items to reorder the relevant set of search results based, at least in part, on visual similarities among the images corresponding to the subset of the items; and transmitting the ranked set of search results to the computing device.

Various embodiments include a method. The method can be implemented via execution of computing instructions configured to run at one or more processors and configured to be stored at non-transitory computer-readable media. The method can comprise: storing image hashes corresponding to images for items offered via an electronic platform; receiving, from a computing device, a search query via a search engine included on the electronic platform; executing a relevance function that identifies a relevant set of search results corresponding to a subset of the items determined to be relevant to the search query; executing a visual diversity ranking function that reorders the relevant set of search results to generate a ranked set of search results, wherein the visual diversity ranking function utilizes the image hashes corresponding to the subset of the items to reorder the relevant set of search results based, at least in part, on visual similarities among the images corresponding to the subset of the items; and transmitting the ranked set of search results to the computing device.

Figure 1:
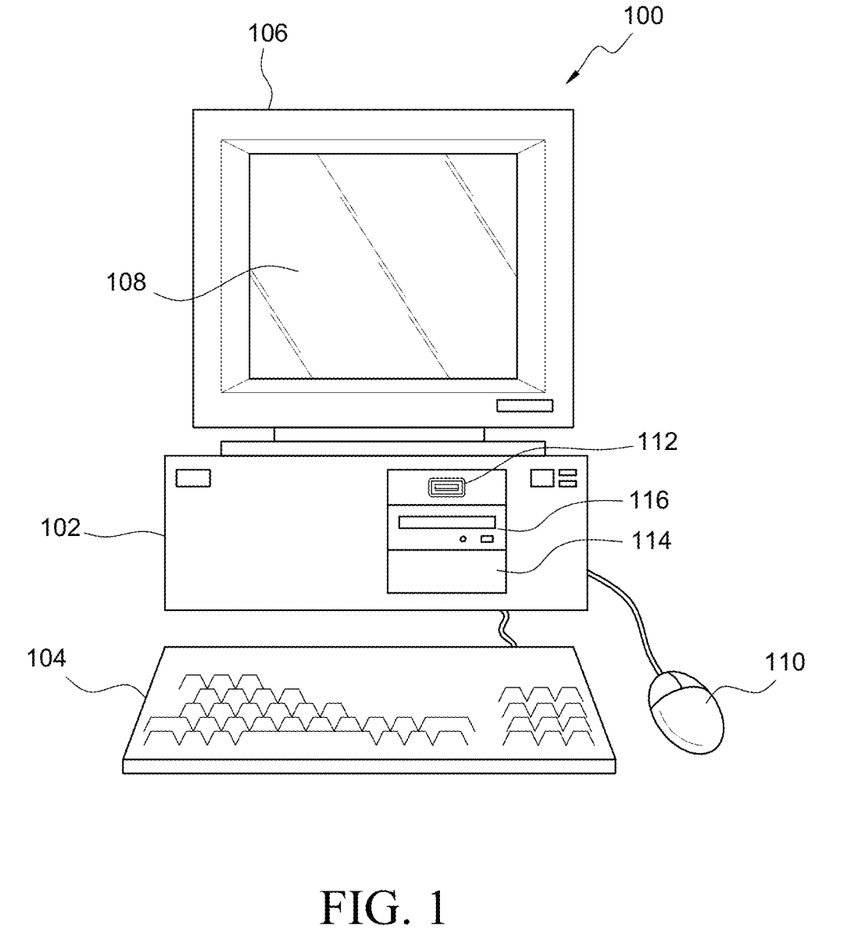
FIG. 1 illustrates a front elevational view of a computer system that is suitable for implementing various embodiments of the systems disclosed in FIGS. 3 and 5.
Figure 2:
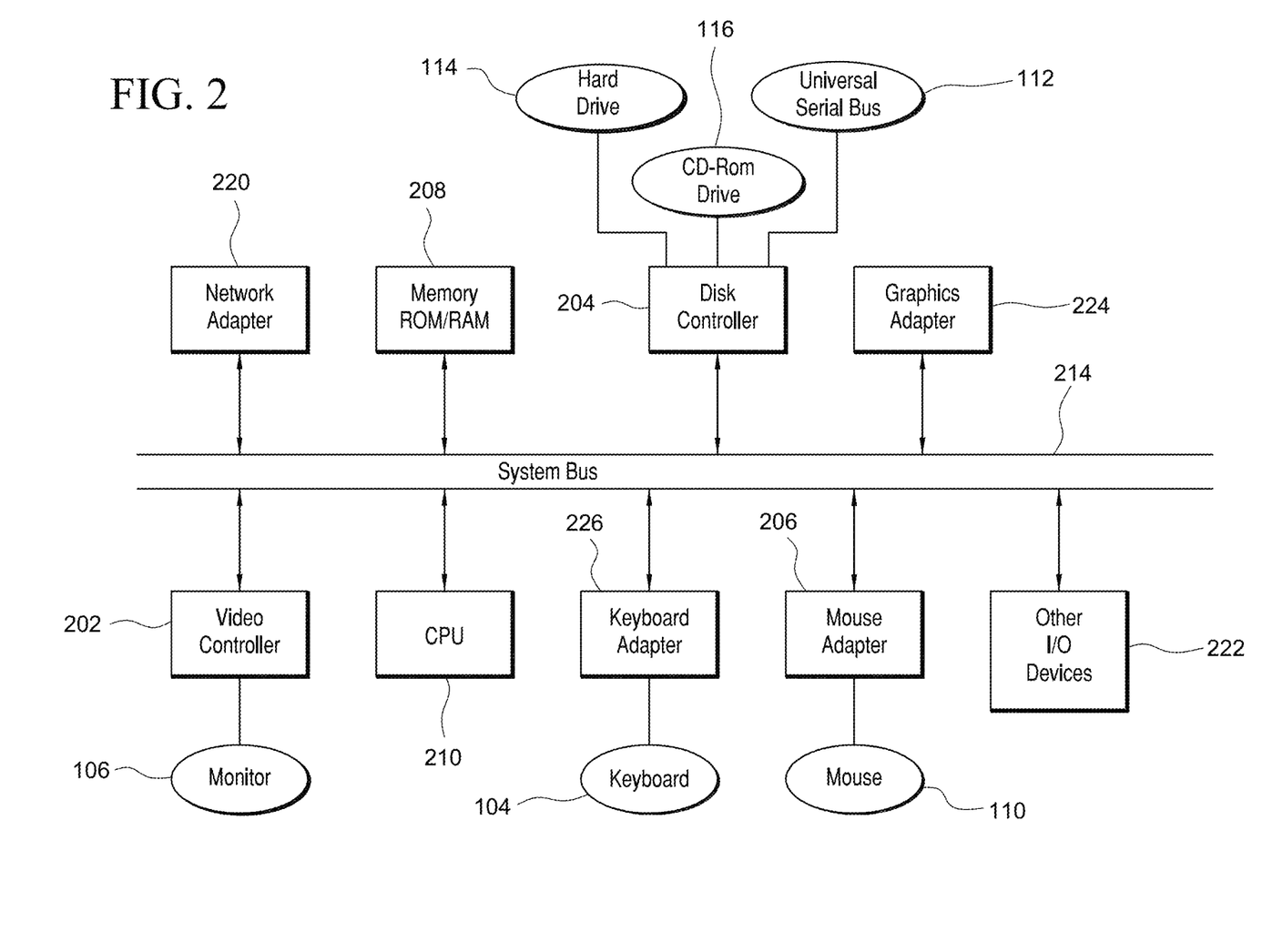
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
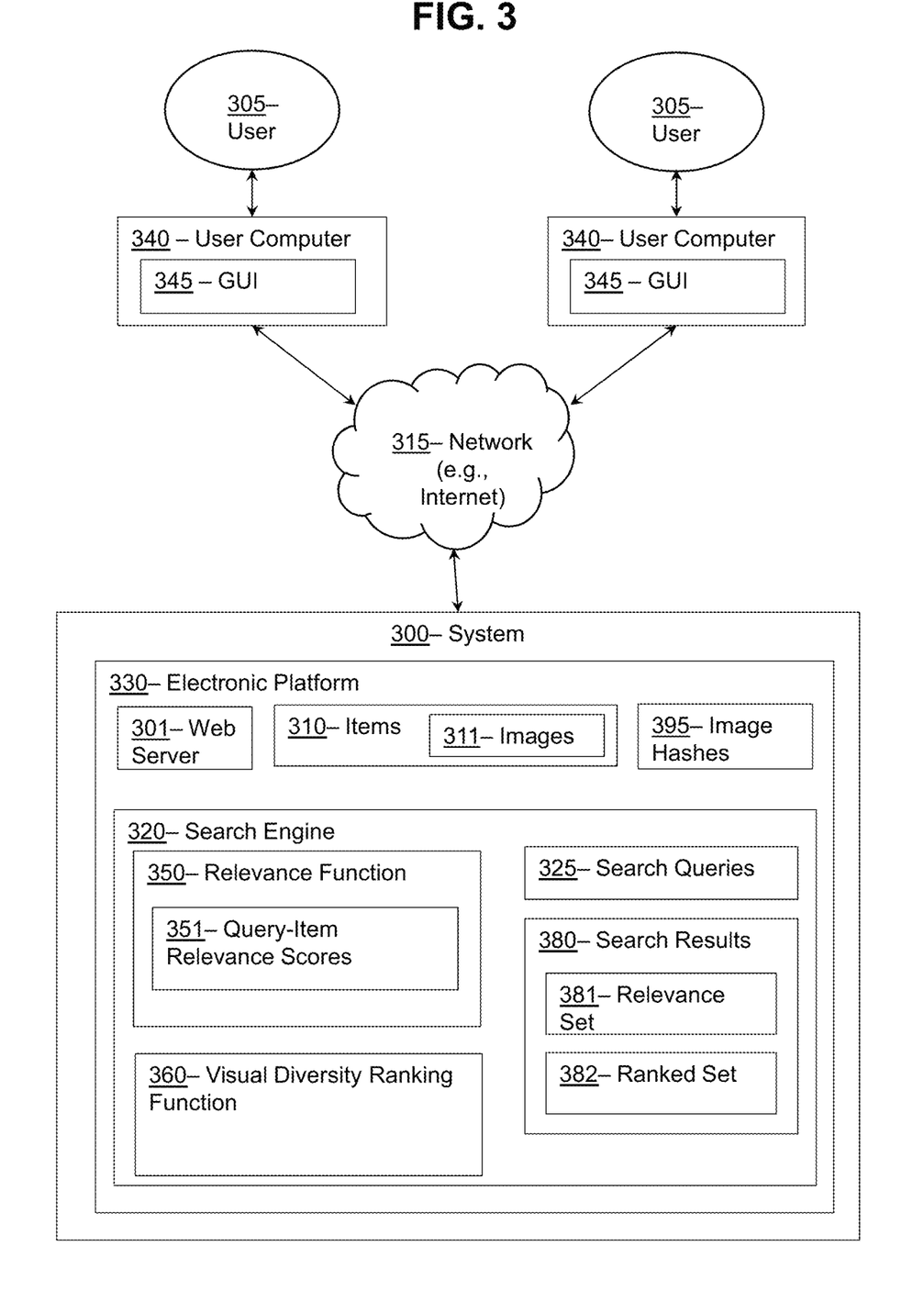
FIG. 3 illustrates a representative block diagram of a system according to certain embodiments.

Turning ahead in the drawings, FIG. 3 illustrates a representative block diagram of a system 300, according to certain embodiments, that can be utilized to identify, rank, and present diversified search results, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 101, a search engine 320, and an electronic platform 330. The web server 101, the search engine 320, and/or electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 101, search engine 320, and/or electronic platform 330. Additional details regarding the web server 101, search engine 320, and/or electronic platform 330 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more server computers (e.g., such as one or more server computers that host the electronic platform 330). In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 101, the search engine 320, and/or electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) associated with the web server 101, the search engine 320, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 101, the search engine 320, and/or electronic platform 330. In a similar manner, the processing module(s) and the memory storage module(s) can be local and/or remote to each other.

In many embodiments, web server 101, the search engine 320, and/or electronic platform 330 can be configured to communicate with one or more user computers 340. In some embodiments, user computers 340 also can be referred to as customer computers. In some embodiments, web server 101, the search engine 320, and/or electronic platform 330 can communicate or interface (e.g., interact) with one or more customer computers (such as user computers 340) through a network 315 (e.g., the Internet). Network 315 can be an intranet that is not open to the public. Accordingly, in many embodiments, web server 101, the search engine 320, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 101, the search engine 320, and/or electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 101, the search engine 320, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart 385 and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc. A database associated with the electronic platform 150 can store various data for each item 310 (e.g., including an item name, an item description, an item category, and one or more images 311 corresponding to the item 310).

Electronic platform 330 can include a search engine 320 that assists users 305 with identifying items 310. The search engine 320 may generally represent any application, program, and/or feature that is configured to search for items 310 included in a database and/or online catalog associated with the electronic platform 330. Users can be presented with GUIs 345 that enable the users to submit search queries 325 to the search engine 320, and GUIs 345 can present search results 380 corresponding to the search queries 325. Each of the search results 380 can correspond to an item 310 included in an online catalog associated with the electronic platform 330. Users 305 can utilize GUIs 345 to view the search results 380, select items 310 included in the search results 380 and, if desired, to add the items 310 to a digital shopping cart 385 and/or initiate purchasing of the items 310.

In many scenarios, the online catalog made available via the electronic platform 330 can comprise thousands or millions of items 310, and the search engine 320 executes a relevance function 350 on a large-scale database to identify a relevance set 381 of search results 380 that are related or relevant to search queries 325 submitted by users 305. For example, in response to receiving a search query 325, the relevance function 350 can compute query-item relevance scores 351 for the items 310 included in the online catalog. Each query-item relevance score 351 can include a value indicating the relevance of a corresponding item 310 to the search query 325. In some scenarios, the query-item relevance score 351 generated for each item 310 can be based, at least in part, on a comparison of the search query 325 with stored descriptive information associated with the item (e.g., such as the item name, textual description, associated item categories, etc.). The items 310 having the greatest query-item relevance scores 351 can be included in a relevance set 381 of search results 380. Prior to presenting the search results on a GUI 345 to a user 305, the search results 380 may be ranked or ordered to generate a ranked set 382 of search results 380. The ranked set 382 of search results may be presented on the GUI 345 for consideration by the user 305.

One technique for ranking the search results 180 can be based on the query-item relevance scores 351 generated for the items. For example, the query-item relevance scores 351 can be used to rank the items from most relevant to least relevant, and the search results 380 can be presented on a GUI 345 in this order. However, this technique may be suboptimal in scenarios where the online catalog includes multiple items that correspond to the same or similar product or service. Using the aforementioned ranking technique in this scenario often results in many identical or similar items being clustered together or being presented consecutively in the search results 380 presented to users 305. For example, the beginning of the search results 380 may include a first cluster of identical or similar items 310, followed by a second cluster of items 310 that are also commonly related, and so on. Presenting search results 380 in this manner can deter efforts to identify relevant items 310, and can degrade a user's experience when searching for desired items 310.

To overcome the aforementioned problems, the search engine 320 may execute a visual diversity ranking function 360 that incorporates diversity into the search results 380 and avoids clustering of identical or similar items 310. In embodiments, after a relevance set 381 of search results 380 is identified, the visual diversity ranking function 360 utilizes image hashes 395 derived from images 311 of the items 310 included in the relevance set 381 of search results 380 to determine a ranking or ordering of the search results 380. The visual diversity ranking function 360 can generate a ranked set 382 of search results in a manner that jointly considers the relevance and visual diversity of the search results 380. This ranked set 382 of search results 380 can then be presented to the user 305.

In certain embodiments, each item 310 can be associated with an image 311 that is displayed when the item 310 is presented in search results 380 to users 305. In an offline, preprocessing operation, an image hash 395 may be generated and stored in an image hash database for each item 310 included in the online catalog. When a search query 380 is received by the search engine 320, a relevance set 381 of search results 380 can be identified using the relevance function 350, and the search results 380 can be ranked or ordered by the visual diversity ranking function 360 using the image hashes 395 corresponding to the items 310 included the search results 380. The visual diversity ranking function 360 utilizes the image hashes 385 to incorporate visual diversity into the ordering of the search results 380, and avoid clustering of items 310 that have identical or similar images 311. Further details regarding the exemplary implementations of the visual diversity ranking function 360 are described below.

The techniques described herein enable the search engine to perform a visual analysis of images corresponding to search results in real-time or near real-time. Typically, performing a comparison of images 310 is computationally expensive and can result in significant delays, especially in scenarios where significant numbers of images are being analyzed. In certain embodiments, the techniques described throughout this disclosure overcome this technical hurdle by precomputing and storing image hashes 395 for each item in an online catalog. This collection of image hashes 395 can then be accessed when searched queries 320 are received by the search engine 320 to rapidly perform image comparisons for the items 380 included in a relevance set 381 of search results 380. Usage of the precomputed image hashes 395 in this manner allows for processing and ranking of the search results 380 on large-scale datasets in real-time or near real-time.

Figure 4:
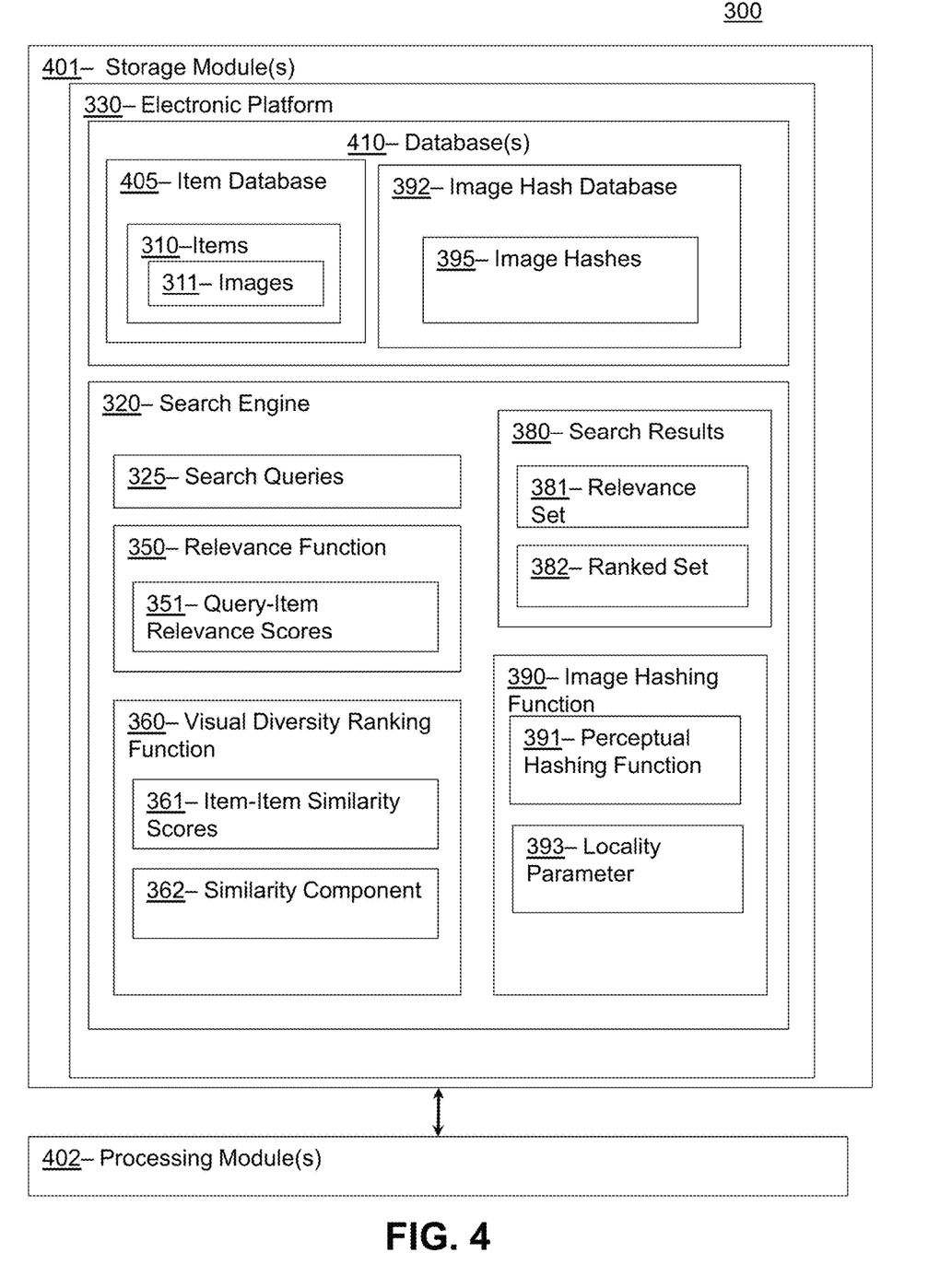
FIG. 4 illustrates a representative block diagram of a portion of the system of FIG. 3 according to certain embodiments.

FIG. 4 is a block diagram illustrating a detailed view of a portion of the system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a search engine 320 and electronic platform 330. The one or more processing modules 402 can be configured to execute any and all instructions associated with implementing the functions performed by these components. Exemplary configurations for each of these components are described in further detail below.

The electronic platform 330 stores one or more databases 410, including an item database 405 and an image hash database 392. The item database 405 can store information or data associated with each item 310 that is offered by the electronic platform 330. For example, for each item 310, the database may store some or all of the following: a) a name or title associated with the item 310; b) a textual description corresponding to the item 310; c) one or more images 311 corresponding to the item 310; and/or d) one or more categories associated with the type of item 310. In scenarios where multiple images 311 are stored for a given item 310, one of the images 311 may be designated as a primary image, which can be displayed when the item 310 is presented in a listing of search results 380.

The image hash database 392 can store at least one image hash 395 for each item 310 included in the item database 405. For example, for each item 310, an image hash 395 may be derived from an image 311 (e.g., a primary image) associated with the item 310. In certain embodiments, the item database 305 may represent a large-scale database that stores information for thousands or millions items 310 (e.g., over 100 million items), and a separate image hash 395 can be derived from an image corresponding to each of the items 310 in an offline preprocessing operation. In some embodiments, the image hash 395 for each image 311 is based on the primary image corresponding to each item 310 (e.g., the image that gets displayed when the item 310 is presented in search results 380). All of the image hashes 395 can be computed in a preprocessing operation, and all of the image hashes 395 can be stored in the image hash database 392.

Various types of image hashing functions 390 can be utilized to generate the image hashes 395. The image hashing function 390 can include an algorithm that computes a unique digital fingerprint or hash value for each image 311. The image hashing function 390 can utilize various techniques to generate the image hashes 395 including, but not limited to average hashing (aHash), perceptual hashing (pHash), difference hashing (dHash), and/or Haar wavelet hashing (wHash). Each image hash 395 may represent an embedding or vector of binary codes that can be utilized to represent a corresponding image 311.

In certain embodiments, the image hashing function 390 can utilize a perceptual hashing function 391 (or pHash function) to generate the image hashes 395. For example, in some embodiments, a 64-bit pHash function may be utilized. In other embodiments, a 1024-bit pHash function also can be utilized.

When a user 305 submits a search query 325 via the search engine 320 during runtime, the relevance function 350 initially can be executed to identify a relevance set 382 of search results 380. As explained above, this can involve generating a query-item relevance score 351, which indicates or predicts a relevance of an item 310 to the search query 325, for each of a plurality of items stored in the item database 305. A threshold number of search results (e.g., top ten, fifty, or hundred) having the highest query-item relevance scores 351 can be chose for inclusion in the relevance set 381 of search results 380. An initial ranking can then be performed on the relevance set 381 of search results 380 using the query-item relevance scores 351 to order the results from most relevant to least relevant.

The visual diversity ranking function 360 can then be executed to visually diversify the relevance set 381 of search results 380. The visual diversity ranking function 360 may receive the initially ranked relevance set 381 (which is ordered from most relevant to least relevant), and sequentially process each search result 380 to generate a re-ranked listing of the search results 380 that incorporates visual diversity. During the processing of the search results 380 included in the relevance set 381, each search result 380 can be evaluated in the order of the initial ranking and a determination is made whether or not to include the search result in a next available ranking position for the re-ranked listing.

When evaluating a given search result 380, the visual diversity ranking function 360 can retrieve the image hash 395 for the corresponding item 310 from the image hash database 392 and compare it to the image hashes 395 for a predetermined number of items 310 that have been recently already added to the re-ranked listing. These comparisons can be utilized to determine if the current search result being evaluated includes an image that is identical or similar to nearby search results 380 that have been recently added in the re-ranked listing. If the current search result being evaluated is not similar to search results that were recently added to the re-ranked listing, then the current search result may be assigned to the next available ranking position in the re-ranked listing. Conversely, if it is determined that the current search result under evaluation is identical or similar to one or more recently added search results, then the current search result may not be added to the next available position in the re-ranked listing and may be demoted for consideration at a later time. Demoting search results that are identical or similar to recently added search results can avoid clustering of identical or similar items in the search results that ultimately get presented to the user 305.

In certain embodiments, the visual diversity ranking function 360 can compute item-item similarity scores 361 to compare an image for a current search result 380 under evaluation with images 311 for other search results that have been recently added to the re-ranked listing. For example, for each search result being evaluated, the visual diversity ranking function 360 can retrieve the image hash 395 corresponding to the search result being evaluated along with the image hashes 395 of the search results 380 recently added to the re-ranked listing. Separate item-item similarity scores 361 can be computed, each of which indicates a similarity between the image hash 395 associated with the current search result and an image hash 395 for a search result already included the re-ranked listing.

In some embodiments, the item-item similarity scores 361 can represent the Hamming distance between each pair of images. Other types of similarity metrics also can be used instead of, or in addition to, the Hamming distance. In some cases, the values of the item-item similarity scores 361 can be compared to a threshold to determine if an image is sufficiently dissimilar or similar to another image 311.

In certain embodiments, a similarity component 362 associated with the visual diversity ranking function 360 can perform the aforementioned functions associated with comparing image hashes 395. In certain embodiments, the similarity component 362 that is trained to compute the similarity (or item-item similarity scores 361) between separate pairs of image hashes 395. For example, the similarity component 362 can be trained in a supervised fashion with a training set of image hashes, which comprises separate pairs of image hashes that are labeled with distance indicators. Each distance indicator can identify a distance or difference measure between a given pair of image hashes. In certain cases, the image hashes used for training can be derived directly from the images 311 stored on the electronic platform 330.

In certain embodiments, a desired level of diversity in the search results can be customized using a locality parameter 393. The locality parameter 393 can correspond to a value or a number that determines how many search results previously added to the re-ranked listing are compared with a search result that is currently being evaluated. For example, if a locality parameter 393 is set to five, the visual diversity ranking function 360 can compare an image hash 395 corresponding to a current search result being evaluated with image hashes 395 for the five search results most recently added to the re-ranked listing. In this example, the locality parameter 393 can ensure that image for the current search result is sufficiently different from the other five search results recently added to the re-ranked listing. However, it should be recognized that the locality parameter 393 can be set to any value, and increasing the value of the locality parameter 393 can increase the level of visual diversity that will appear in the ranked set 382 of search results 380 that can presented to users.

Figure 5:
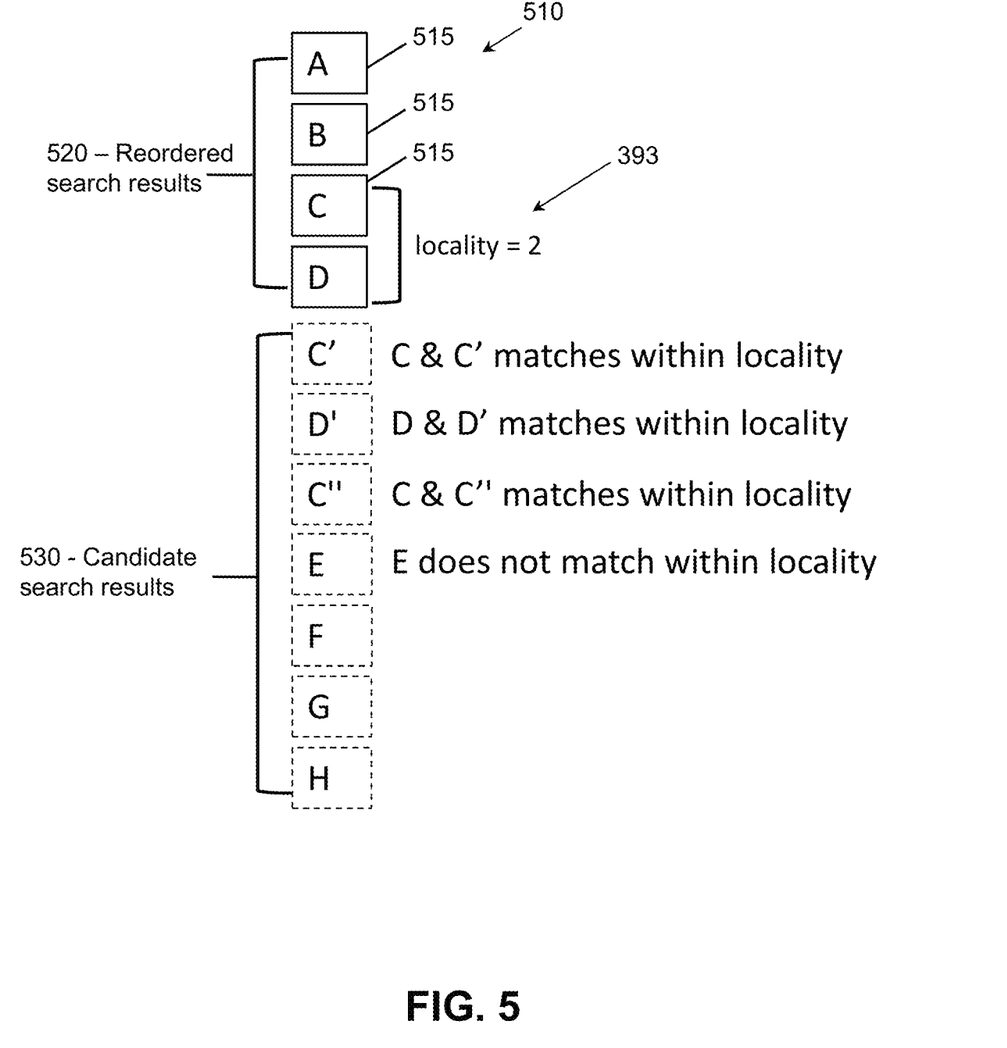
FIG. 5 is a diagram illustrating a ranking technique according to certain embodiments.

FIG. 5 is a diagram that illustrates an application of the visual diversity ranking function in an exemplary scenario according to certain embodiments.

In this example, visual diversity ranking function already received a relevance set of search results that was initially ranked from most relevant to least relevant, and the visual diversity ranking function is operating to sequentially process or evaluate the search results to generate a re-ranked listing 510 that incorporates visual diversification into the ordering of the search results 380. Four of the search results (corresponding to the reordered search results 520 or reordered items) have already been assigned a ranking position 515 in the re-ranked listing 510, and seven of the search results (corresponding to the candidate search results 530 or candidate items) are yet to be assigned a ranking position 515 in the re-ranked listing 510.

The letters (A through H) associated with the reordered search results 520 and candidate search results 530 represent images corresponding to each search result or item included in the relevant set. Different letters represent different or dissimilar images. Similar denotations (e.g., such as C/C'/C" or D/D') denote images that are identical or similar.

When the relevant set of search results was initially received, the search result or item with the highest relevance score (query-item relevance score) was automatically added to the first position in the re-ranked list 510 (i.e., the search result or item associated with image A). Three additional search results were subsequently added to the re-ranked listing 510 (i.e., the search results or items associated images B, C, and D). Because the locality parameter 393 is set to two in this example, each one of these three search results was added after the visual diversity ranking function compared a corresponding image for the search result with images for the two most recent search results that had been previously added to the re-ranked listing 510.

For example, the search result or item corresponding to image C was added to the third ranking position in the re-ranked listing 510 after hash comparisons (or corresponding item-item similarity scores) confirmed that image C was not identical or similar to images A and B, which are included in the first two positions of the re-ranked listing 510. Likewise, the search result or item corresponding to image D was added to the fourth ranking position after hash comparisons (or corresponding item-item similarity scores) confirmed that image D was not identical or similar to images B and C. Similarly, image B was added to the second ranking position after confirmation that image B was not identical or similar to image A (there was only one image in the re-ranked listing for comparison at that point).

In the example of FIG. 5, the visual diversity ranking function is now determining which of the remaining candidate items 530 (or remaining candidate search results) to include in the fifth ranking position. As mentioned above, the visual diversity ranking function will consider each candidate search result based on the initial order of relevancy. The next candidate search result 530 corresponds to the item or search result that has image C'. The visual diversity ranking function computes item-item similarity scores between the candidate search result 530 associated with image C' and the two most recent search results added to the re-ranked listing 510 (i.e., search results having images C and D). Because image C' is similar to image C in the third ranking position, the corresponding search result or item is not immediately added to the next position in the re-ranked listing 510, but rather can be set aside as a leading candidate while the visual diversity ranking function moves on to evaluate the next candidate search result 530, which is associated with image D'.

The next two next remaining candidate search results 530 (that are associated with images D' and C") also have images that are similar to the search results recently added to the re-ranked listing 510 within the window defined by the locality parameter 393. Therefore, these candidate search results 530 are also not immediately added in the next position of the re-ranked listing 510, but rather each in turn can be compared against the leading candidate, and can replace the leading candidate if their respective score is computed to be higher. In this way, the leading candidate represents the item having the highest score found, where the score is computed as relevance minus similarity. The visual diversity ranking function then moves on to evaluate the next candidate item 530, which is associated with image E. This candidate item 530 associated with the image E is also compared against the leading candidate, likewise replacing the leading candidate if the score of the candidate item 530 is found to be higher.

Image E is sufficiently different from the images corresponding to the two most recently added search results, which means that the algorithm can now conclude its candidate search for this round. At this point, the leading candidate is added in the next position of the re-ranked listing 510 (i.e., the fifth position), while any unselected items from the candidate consideration process still remain in the general candidate pool for reconsideration in future rounds of selection.

Once a candidate with sufficient dissimilarity is encountered, in this case the item is associated with image E, the visual diversity ranking need not iterate through the remaining candidate items 530 (that are associated with images F, G, and H) to determine the best option to include in the fifth ranking position, because once an item with sufficient dissimilarity is encountered, it can be proven that the highest scoring item is among the items already considered. This result is because the candidate items 530 are already ordered based on their relevancy scores (query-item relevance scores), and for any item which has no similarity penalty, its score is simply its relevance. When an item having sufficient dissimilarity is encountered, because it has no similarity penalty and its score is simply its relevance, any subsequent items lower in the list must have lower relevance scores, and any similarity penalty that can be applied to subsequent item serves to further lower the scores of those subsequent items. Thus, any subsequent items lower in the list can score lower (or at best equal), but never higher than the item higher in the list which has no similarity penalty.

Thus, if item E is the first encountered item that has no similarity penalty, then no item after E can outscore item E because the score is calculated as relevance minus similarity. In this manner, the iterative algorithm utilized by the visual diversity ranking function can represent an efficient O(n) implementation with early stopping.

Item E, however, can still be compared against those items which came before it and which had similarities to prior selected items (i.e., C', D', and C"), because those prior items had higher relevance scores than item E. Thus depending on how heavily the similarity penalty is weighted, the prior selected items can potentially still yield a higher total score than item E despite their respective similarity penalty after the scoring formula of relevance minus similarity is applied. A sufficiently high relevance score with sufficiently low similarity penalty can, in certain cases, potentially cause items C', D', or C" to score higher than item E despite the fact that item E is visually dissimilar while the others were not.

In this example, however, the search result corresponding to image E is found to have the highest score from candidates which were considered [C', D', C", E]. This result means that item E can represent the optimal blend of relevance and visual difference from the search results recently added to the re-ranked listing 510. After E is identified and selected, the iterative process for evaluating the candidate items 530 for the fifth ranking position can conclude.

Staying with the above example, the visual diversity ranking function will restart the process to identify a remaining candidate item 530 to be included in the next ranking position (i.e., the sixth position) of the re-ranked listing 510. That is, the visual diversity ranking function will start at the top (or beginning) of the candidate search result listing where the search result corresponding to image C' is still located, and will iterate through each of the candidate search results 530 to select the next candidate search result having an image that is sufficiently different from the two search results most recently added to the re-ranked listing 510 (which would be the search results corresponding to images D and E at this point in the process). This process can be performed continuously until all (or a predetermined number) of the candidate search results 530 have been added to the re-ranked listing 510 of search results.

The above-described ordering technique can produce a re-ranked listing 510 of search results in a manner that jointly considers both the relevancy of search results to a given search query and the visual diversity of the search results to themselves. Additionally, this technique can avoid clustering of identical or similar items in the search results that are ultimately presented to users. Furthermore, the locality parameter can be customized to specify a desired level of visual diversity.

For simplicity purposes, the above example described a re-ranking procedure for eleven search results with a locality parameter being set to two. However, it should be noted that the same or similar procedure can be applied on larger sets of relevant search results (e.g., which, in some cases, can include dozens or hundreds of search results) and the locality parameter can be set to any value.

Returning to the description of FIG. 4, the visual diversity ranking function 360 can generate a re-ranked listing for a ranked set of search results by iteratively adding a single search result to each ranking position in the manner described above. In some cases, this ranking technique can be modeled using the following equation:

$$\max_{item\ i \in R \setminus S_d} \left[ \lambda \cdot Sim(\text{query}, item\ i) - (1 - \lambda) \cdot \max_{item\ j \in S_d} Sim(item\ i, item\ j) \right]$$

where:
R is the set of search results or items being ranked;
$S_d \subseteq R$ is the set of search results or items placed so far within a context window d; and
d; and
$\lambda \in [0,1]$ is a tradeoff parameter balancing the two objectives.

Figure 6:
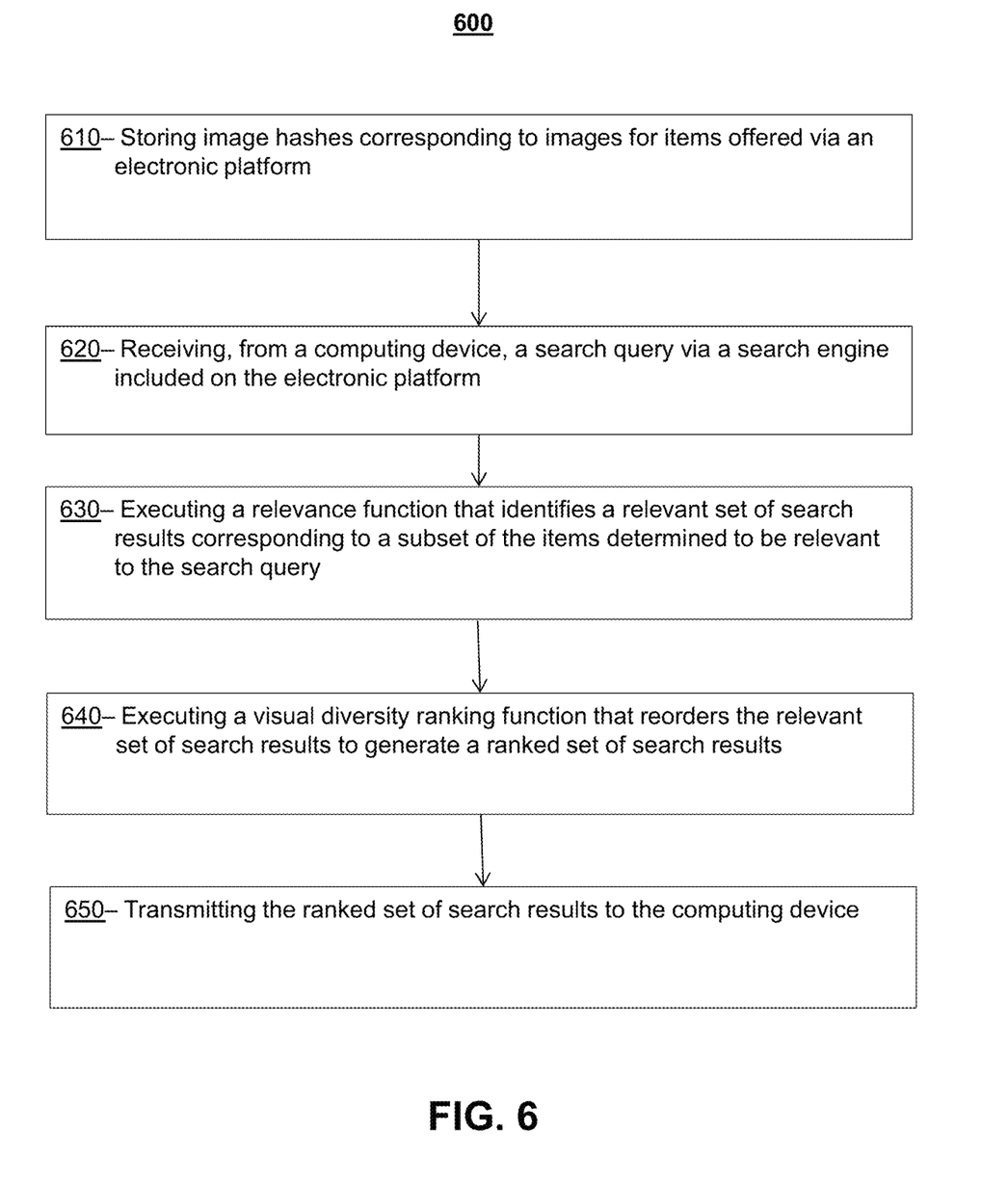
FIG. 6 illustrates a flowchart for a method according to certain embodiments.

FIG. 6 illustrates a flow chart of a method 600 for generating a ranked set of items according to an embodiment. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, system 300 (FIG. 3) can be suitable to perform method 600 and/or one or more of the steps of method 600. In these or other embodiments, one or more of the steps of method 600 can be implemented as one or more computer instructions configured to run at one or more processing modules and configured to be stored at one or more non-transitory memory storage modules. Such non-transitory memory storage modules can be part of a computer system such as system 300 (FIGS. 3-4), web server 301 (FIG. 3), search engine 320 (FIGS. 3-4), and/or electronic platform 330 (FIGS. 3-4). The processing module(s) can be similar or identical to the processing module(s) described above with respect to computer system 100 (FIG. 1).

In step 610, image hashes corresponding to images for items offered via an electronic platform are stored.

In step 620, a search query is receiving from a computing device via a search engine included on the electronic platform.

In step 630, a relevance function is executed that identifies a relevant set of search results corresponding to a subset of the items determined to be relevant to the search query.

In step 640, a visual diversity ranking function that reorders the relevant set of search results to generate a ranked set of search results. In some embodiments, the visual diversity ranking function utilizes the image hashes corresponding to the subset of items to reorder the relevant set of search results based, at least in part, on visual similarities among the images corresponding to the subset of items.

In step 650, the ranked set of search results is transmitted to the computing device.

Embodiments of the systems and methods described above provide a sequential greedy algorithm that modifies the ordering of search results in phases to improve visual diversity. The algorithm demotes a search result if it is visually similar to any previously placed item in the search window. Item pHash (computed offline in various embodiments for each item primary image) can be used to check image similarity during runtime to efficiently implement the algorithm in a way that reduces the time complexity from polynomial to linear to reduce significant latencies to search requests.

In many embodiments, the techniques described herein can provide a practical application and several technological improvements. In some embodiments, the techniques described herein can improve visual diversity included in a set of search results. These techniques described herein can provide a significant improvement over conventional approaches for presenting search results, such as approaches that present search results in an ordering that is based purely on relevancy of the search results.

In a number of embodiments, the techniques described herein can advantageously improve user experiences by diversifying search results in a manner that avoids clustering or grouping of similar search results. This can enable users to identify desired search results more rapidly. In various embodiments, the techniques described herein can query an image hash database to compare image hashes of search results included in a relevance set in real time. This can permit a search engine to rapidly compare images corresponding to the search results during runtime without a human perceptible delay.

In many embodiments, the techniques described herein can be used continuously at a scale that cannot be reasonably performed using manual techniques or the human mind. For example, as described above, electronic platforms may store hundreds of millions of items and the techniques described herein can rapidly identify relevant search results corresponding to the items, and compare image hashes corresponding to the relevant items to rank the search results.

In a number of embodiments, the techniques described herein can solve a technical problem that arises only within the realm of computers, as image hashing and hash comparison functions do not exist outside the realm of computer networks.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
   a processor; and
   a non-transitory computer-readable storage device storing computing instructions that, when run on the processor, cause the processor to execute operations comprising:
      storing image hashes that are generated offline for items offered via an electronic platform;
      receiving, from a computing device, a search query via a search engine included on the electronic platform;
      executing a relevance function that identifies a relevant set of search results corresponding to a subset of items, of the items, determined to be relevant to the search query, wherein the image hashes include particular image hashes corresponding to three or more of the subset of items;
      executing a visual diversity ranking function that reorders the relevant set of search results by:
         comparing, during a runtime after receiving the search query, the particular image hashes to configure a level of visual diversity; and
         generating a re-ranked set of search results by:
            adding a first item, of the subset of items, with highest relevance of the relevant set of search results to a first ranking position of the re-ranked set of search results,
            adding a second item, of the subset of items, to a second ranking position of the re-ranked set of search results based on comparing the particular image hashes indicating that an image for the second item is visually different from an image for the first item, and
            adding a third item, of the subset of items, to a third ranking position of the re-ranked set of search results based on comparing the particular image hashes indicating that an image for the third item is visually different from the image for the first item and the image for the second item; and
      transmitting the re-ranked set of search results to the computing device.

2. The system of claim 1, wherein the visual diversity ranking function reorders the relevant set of search results based on both:
   query-item relevance scores indicating or predicting a relevance for each search result included in the relevant set of search results; and
   item-item similarity scores indicating or predicting visual similarities between or among images corresponding to the relevant set of search results.

3. The system of claim 2, wherein:
   the query-item relevance scores are utilized to perform an initial ranking of the relevant set of search results; and
   the item-item similarity scores are utilized to re-rank the relevant set of search results, after the initial ranking.

4. The system of claim 1, wherein:
   a first ranking of the relevant set of search results orders the relevant set of search results based on query-item relevance scores generated for the relevant set of search results; and
   the visual diversity ranking function evaluates the relevant set of search results included in an order based on the first ranking.

5. The system of claim 1, wherein generating the ranked set of search results comprises:
   generating the re-ranked set of search results based on comparing the image hashes and based on a locality parameter that is customized to configure the level of visual diversity.

6. The system of claim 5, wherein:
   the locality parameter specifies a predetermined number of image hashes that are utilized for comparison.

7. The system of claim 1, wherein a perceptual hash function is utilized to generate the image hashes.

8. The system of claim 1, wherein the image hashes are stored in an image hash database that can be accessed in real-time or near real-time to perform comparisons after receiving the search query.

9. The system of claim 1, wherein, in response to receiving the search query, the visual diversity ranking function is configured to access an image hash database in real-time, wherein the image hash database stores the image hashes.

10. The system of claim 1, wherein:
    a query-item relevance score is generated for each search result included in the relevant set of search results.

11. A method implemented via execution of computing instructions by a processor and stored on a non-transitory computer-readable storage device, the method comprising:
  storing image hashes that are generated offline for items offered via an electronic platform;
  receiving, from a computing device, a search query via a search engine included on the electronic platform;
  executing a relevance function that identifies a relevant set of search results corresponding to a subset of items, of the items, determined to be relevant to the search query, wherein the image hashes include particular image hashes corresponding to two or more of the subset of items;
  executing a visual diversity ranking function that reorders the relevant set of search results by:
    comparing, during a runtime after receiving the search query, the particular image hashes to configure a level of visual diversity; and
    reordering the relevant set of search results based, at least in part, on differences between the particular image hashes such that images of the relevant set of search results that are at a top of a re-ranked set of search results are visually different from each other; and
  transmitting the re-ranked set of search results to the computing device.

12. The method of claim 11, wherein the visual diversity ranking function reorders the relevant set of search results based on both:
  query-item relevance scores indicating or predicting a relevance for each search result included in the relevant set of search results; and
  item-item similarity scores indicating or predicting visual similarities between or among the images.

13. The method of claim 12, wherein:
  the query-item relevance scores are utilized to perform an initial ranking of the relevant set of search results; and
  the item-item similarity scores are utilized to re-rank the relevant set of search results, after the initial ranking.

14. The method of claim 11, wherein:
  a first ranking of the relevant set of search results orders the relevant set of search results based on query-item relevance scores generated for the relevant set of search results; and
  the visual diversity ranking function evaluates the relevant set of search results included in an order based on the first ranking.

15. The method of claim 11, wherein reordering the relevant set of search results comprises:
  reordering the relevant set of search results based on comparing the particular image hashes and a locality parameter that configures the level of visual diversity.

16. The method of claim 15, wherein:
  the locality parameter specifies a predetermined number of image hashes that are utilized for comparison.

17. The method of claim 11, further comprising:
  generating the image hashes using a 64-bit perceptual hash function.

18. The method of claim 11, further comprising:
  accessing, based on receiving the search query, an image hash database in real-time to generate the re-ranked set of search results, wherein the image hash database stores the image hashes.

19. A non-transitory computer-readable medium storing instructions, wherein the instructions, upon execution by a processor, cause the processor to perform operations comprising:
  storing image hashes that are generated offline for items offered via an electronic platform;
  receiving, from a computing device, a search query via a search engine included on the electronic platform;
  executing a relevance function that identifies a relevant set of search results corresponding to a subset of items, of the items, determined to be relevant to the search query, wherein the image hashes include particular image hashes corresponding to two or more of the subset of items;
  executing a visual diversity ranking function that reorders the relevant set of search results by:
    comparing the particular image hashes to configure a level of visual diversity; and
    generating a re-ranked set of search results by:
      adding a first item, of the subset of items, with highest relevance of the relevant set of search results to a first ranking position of the re-ranked set of search results,
      adding a second item, of the subset of items, to a second ranking position of the re-ranked set of search results based on comparing the particular image hashes indicating that an image for the second item is visually different from an image for the first item, and
      adding a third item, of the subset of items, to a third ranking position of the re-ranked set of search results based on comparing the image hashes indicating that an image for the third item is visually different from the image for the first item and the image for the second item; and
  transmitting the re-ranked set of search results to the computing device.

20. The non-transitory computer-readable medium of claim 19, wherein a locality parameter specifies a number of image hashes that are utilized for comparison for generating the re-ranked set of search results.

* * * * *